July 3, 1951  O. R. BRINEY, JR  2,558,815
BORING TOOL STRUCTURE
Filed March 15, 1950  3 Sheets-Sheet 1
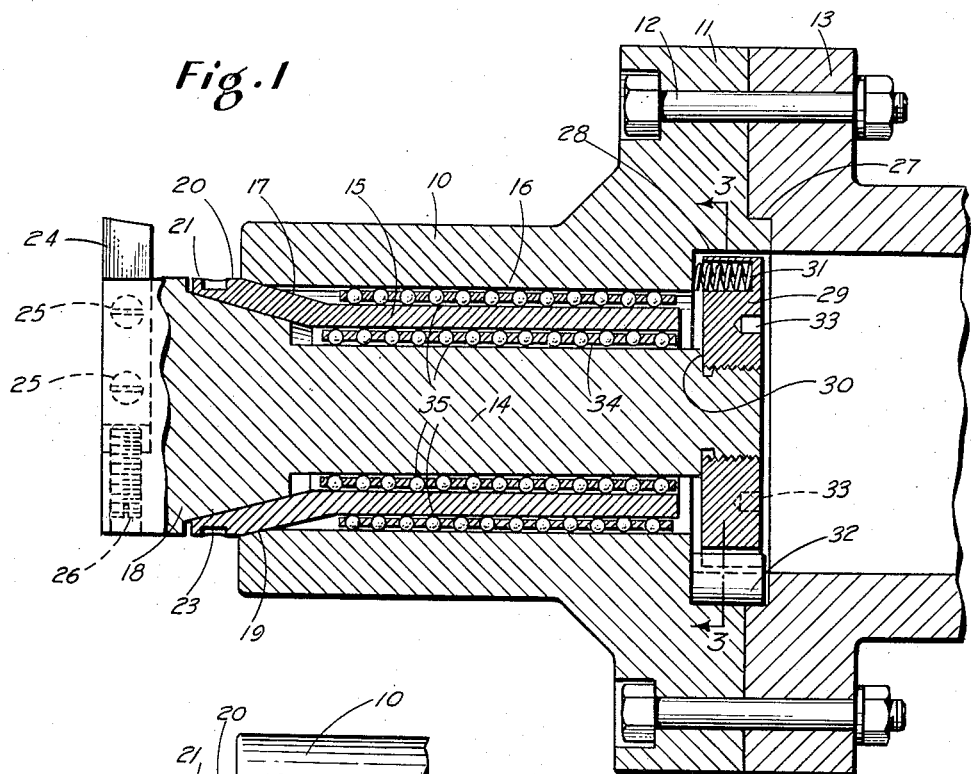
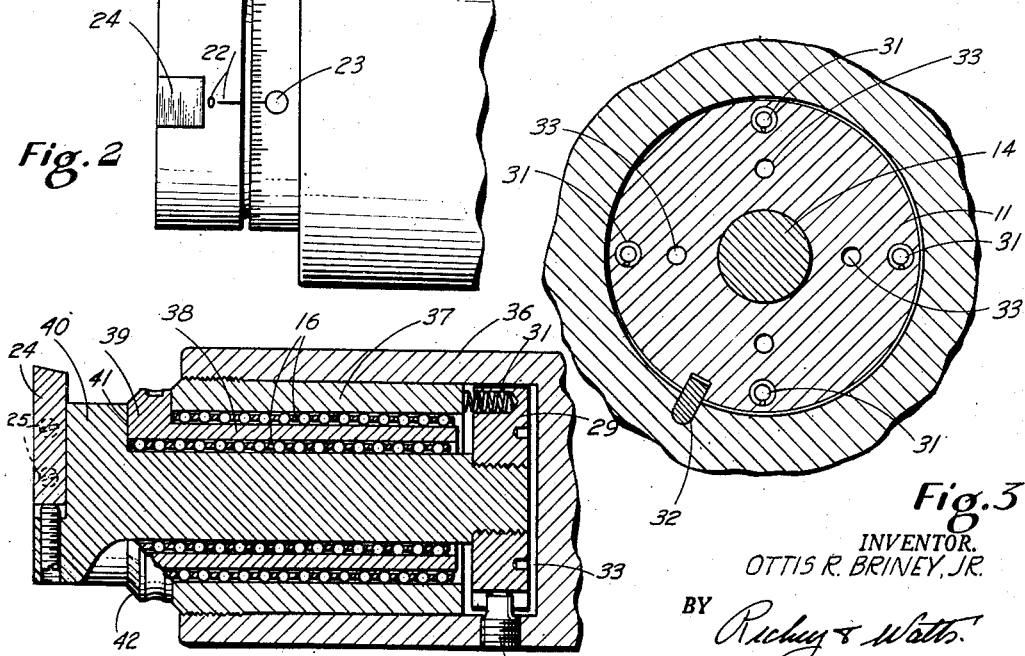
INVENTOR.
OTTIS R. BRINEY, JR.
BY Richey & Watts
Attorneys July 3, 1951     O. R. BRINEY, JR     2,558,815
BORING TOOL STRUCTURE
Filed March 15, 1950     3 Sheets—Sheet 2
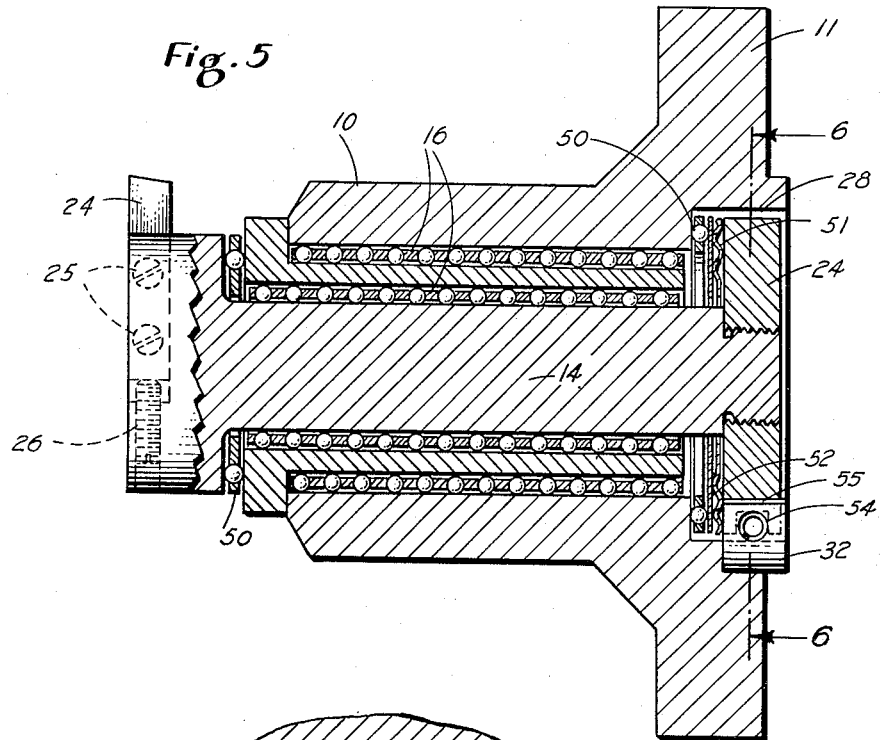
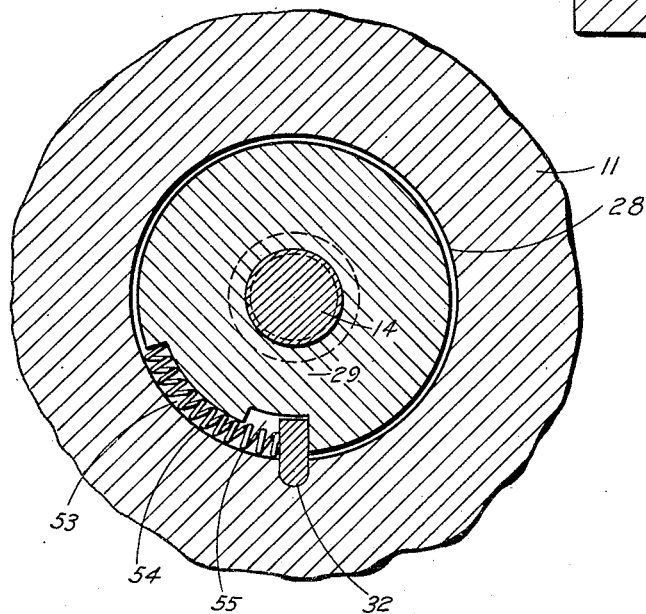
INVENTOR.
OTTIS R. BRINEY, JR.

July 3, 1951 — O. R. BRINEY, JR — 2,558,815
BORING TOOL STRUCTURE
Filed March 15, 1950 — 3 Sheets-Sheet 3

INVENTOR.
OTTIS R. BRINEY, JR.
BY
Richey & Watts
Attorneys

Patented July 3, 1951

2,558,815

UNITED STATES PATENT OFFICE 2,558,815

BORING TOOL STRUCTURE

Ottis R. Briney, Jr., Pontiac, Mich.

Application March 15, 1950, Serial No. 149,794

11 Claims. (Cl. 279—6)

This invention relates broadly to boring tools and more specifically to mechanism for adjusting the depth of cut of the tool therein.

In a boring bar or similar tool of the type in which the cutter or supporting mechanism therefor is retained by a clamp that must be released to facilitate adjustments, it has been found that the tool is invariably moved radially during the final tightening operation and thus necessitates repetitous gauging operations and arduous manipulation of the parts of the assembly before the tool can be set in its operative position.

The present invention avoids the foregoing difficulties through the provision of a boring bar having a cutter therein and an eccentric sleeve which is designed to effect the radial distention or retraction of the cutter without disturbing the parts of the assembly formerly bolted or clamped together.

The salient objects of the invention reside in the provision of a boring head having an eccentric sleeve therein which is mounted in pre-loaded anti-friction bearings to facilitate rotational adjustment thereof, restrain radial deflection of the tool holder, and maintain the rigidity of the assembly during the use thereof.

Another object of the invention is to provide a boring head which may be readily adjusted compensative of wear of the cutter without manipulation of the tool clamping screws or the use of a dial indicator or similar gauging instrument.

Another object of the invention is to provide a tool adjusting mechanism in which the parts that are subjected to relative movement are relieved from wear.

Further objects of the invention reside in the provision of a boring head which is designed to eliminate flexure of the parts of the assembly, resist vibrational strains imposed upon the cutter, assure accuracy of the cut throughout the length thereof, and a tool which will produce a smooth, even, uninterrupted finish on the work piece produced thereby.

Other objects and advantages more or less ancillary to the foregoing and the manner in which all the various objects are realized will appear in the following description, which, considered in connection with the accompanying drawings, sets forth the preferred embodiment of the invention.

Referring to the drawings:

Fig. 1 is a longitudinal sectional view of the improved boring head;

Fig. 2 is a plan view of a fragmentary portion thereof;

Fig. 3 is a transverse section through the head, the section being indicated by the line 3—3 in Fig. 1;

Fig. 4 is a longitudinal sectional view of an alternate form of the structure illustrated in combination with the spindle of a boring machine;

Fig. 5 is a longitudinal sectional view of a modified form of the tool illustrated in Fig. 1;

Fig. 6 is a transverse sectional view thereof, the section being taken on a plane indicated by the line 6—6 in Fig. 5;

Figure 7:
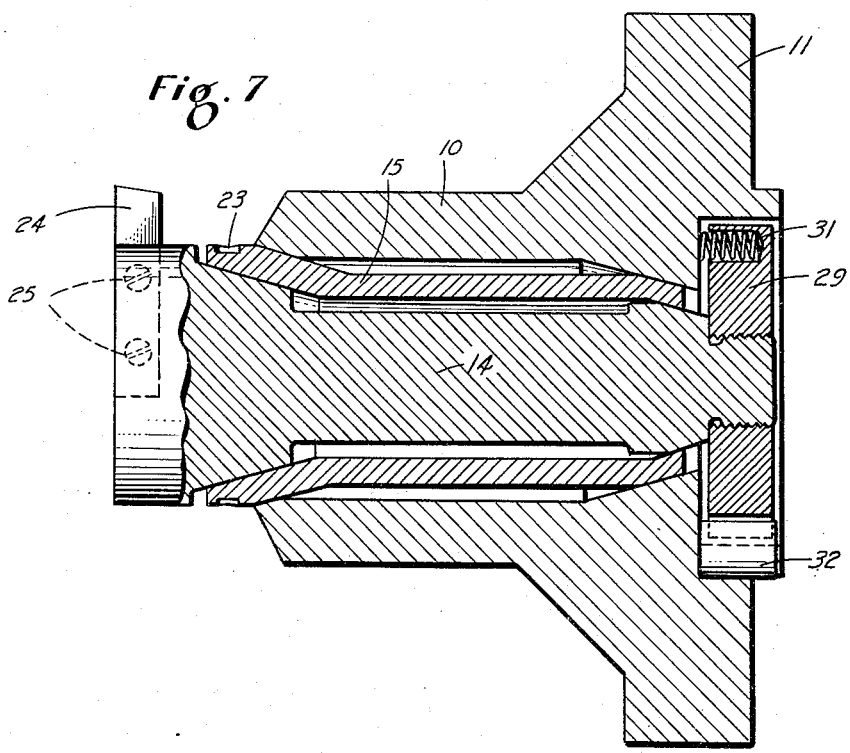
Fig. 7 is a longitudinal sectional view of another modified form of tool similar to that illustrated in Fig. 1.

Referring first to Fig. 1, the improved boring head comprises a cylindrical housing or boring bar retainer 10 having a flange 11 thereon which is supported through bolts 12 on a companion flange 13 on the end of the spindle of a boring machine. The housing is bored throughout its length for the reception of a boring bar 14 which is mounted in an eccentric sleeve 15 supported between anti-friction bearings 16. The outer end of the sleeve is formed with a conical bearing surface 17 which is ground and lapped for engagement with a tapered end portion 18 of the bar and a chamfered seat 19 in the housing. The outer end of the conical portion of the sleeve is machined with a cylindrical surface 20 having graduation marks 21 thereon which are calibrated to indicate, in thousandths of an inch or fractions thereof, the radial movement of the cutting tool in the bar upon rotative adjustment of the eccentric sleeve. The boring bar is inscribed with a reference mark 22 on the outer face thereof to guide the operator when making adjustments, and blind openings 23 are provided in the end of the sleeve to accommodate the reception of a pin wrench or similar tool. The free end of the boring bar is machined with a recess therein to receive a cutter such as the tool bit 24 and the bar is cross-drilled and tapped for set screws 25 for clamping the tool bit in place. The bar is further machined to receive a set screw 26 disposed for abutting engagement with the inner end of the tool bit to facilitate radial adjustment thereof.

The housing 10 is provided with a pilot bearing 27 in the inner end thereof which is proportioned for snug engagement in a recess in the end of the machine spindle. The housing is further machined with a counterbore 28 therein for the reception of a nut 29 seated upon a shoulder 30 defined by a threaded diametrically reduced end portion of the boring bar 14. The inner face of the nut is drilled to support a plurality of helical springs 31 which are organized to urge the tapered end of the boring bar into seated engagement with the bore of the conical portion of the sleeve. The boring bar is driven by the nut through a key 32 mounted in the machine spindle and housing 10 and recesses 33 may be provided in the face of the nut to accommodate a tool for drawing the nut into impinged relation with the shoulder 30.

In the construction of the boring head the housing, sleeve, boring bar, and nut are all hardened and ground and the tapered surfaces of the housing, sleeve, and bar are lapped in place. The bore in the housing and the outer face of the sleeve are preferably concentric and the bore of the sleeve is ground and lapped eccentric with the outer circumferential face thereof. The anti-friction bearings comprise bronze bushings 34 having openings therein for the balls 35 which are retained in the conventional manner by restricted ledges below the protruding faces of the balls.

In the modified form of the embodiment illustrated in Fig. 4, the outer end of the machine spindle is bored and tapped for the reception of a bushing 37 forming thus a counterpart of the cylindrical portion of the housing 10. The sleeve 38 is formed with a shoulder 39 on the outer end thereof which is normal to the axes of the bushing and disposed in abutting engagement therewith. The boring bar 40 is likewise formed with a shoulder 41 normal to the axis thereof and engaged with a parallel end face of the sleeve. The graduations in this embodiment are inscribed in a beveled face 42 of the sleeve and a reference mark is engraved on the circumferential face of the bar. A driving pin 43 is preferably substituted in this embodiment for the key 32 employed in the former case.

The structure illustrated in Fig. 5 is similar to that shown in Fig. 1 save that thrust bearings 50 are interposed between the shouldered ends of the boring bar and sleeve, and the end wall of the counterbore in the housing or retainer and the nut 29. The spring 51 as illustrated may be formed from a corrugated spring steel disk, in which case a washer 52 is interposed between the thrust bearing and contiguous face of the spring. The nut 29 in this embodiment is formed with a groove 53 in the circumferential face thereof for the reception of a helical spring 54 disposed in compressive engagement with the driving key 32. The key seat 55 is enlarged circumferentially to accommodate limited rotative movement of the bar during the initial movement of the nut so that the boring bar 14 may rotate within its eccentric sleeve when the cut is started and rotate in the opposite direction under the influence of the spring when the cut is finished. This arrangement is provided to facilitate retraction of the cutting tool in order to avoid scoring or cutting a lineal groove in the work piece when the tool is withdrawn therefrom.

In the embodiment illustrated in Fig. 7, the anti-friction bearings are eliminated and conical bearing surfaces are provided on the inner end of the boring bar, the sleeve, and the retainer or housing 10. The conical surfaces of the eccentric sleeve and mating parts are designed with limited bearing areas and an angle which will avoid seizing of the tapered parts.

Figure 8:
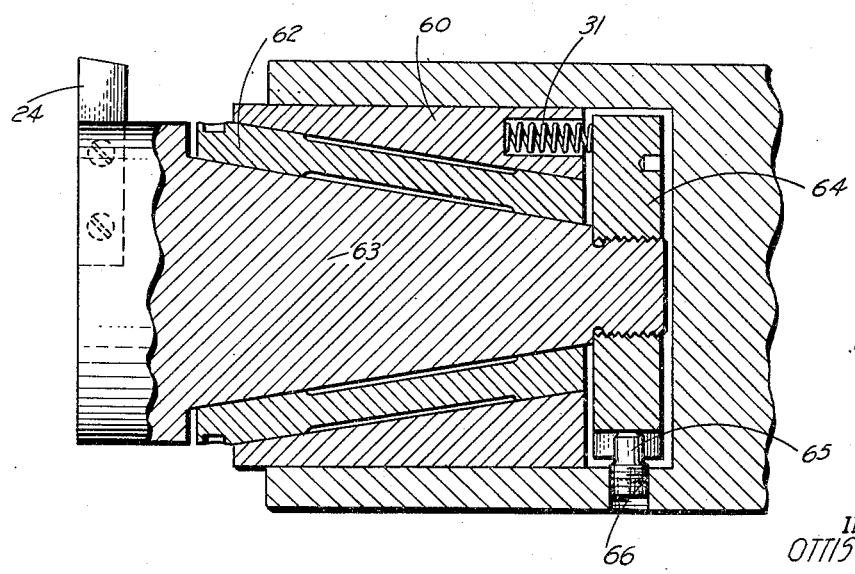
Fig. 8 is a longitudinal sectional view of a further modified structure.

As illustrated in Fig. 8, the tool is supported in the end of a machine tool spindle which is bored for the reception of a bushing 60 having a conical bore therein. The eccentric sleeve 62 in this embodiment is similar to that illustrated in Fig. 7 save that the body thereof is tapered throughout its length and the boring bar 63 is of complementary configuration to accommodate seated engagement thereof with the sleeve. The nut 64 in this form of tool is preferably driven by a pin 65 having an enlarged threaded portion 66 thereon which is threaded in a tapped opening in the machine tool spindle.

In operation the tool bit 24 is adjusted in the usual manner to form a hole in the work piece of the requisite size. As the cutting edge of the tool wears away, readjustment thereof may be made by rotating the eccentric sleeve to advance the tool radially outward, as indicated by the graduations, to the desired position. The rotative movement of the sleeve is attained through the advantage of the anti-friction bearings or limited bearing areas when the operator applies sufficient effort to overcome the spring load or frictional engagement between the boring bar, sleeve, and housing.

The rigidity of the assembly and precision thereof is accomplished by mounting the balls in press-fit relation with the boring bar and sleeve or by forming the bearing surfaces at an angle which will assume the support of the parts yet afford sufficient axial separation to accommodate rotative adjustment of the sleeve.

The pre-loaded ball mechanism provides a desirable adjusting medium under all thermal conditions. When the tool is cold or extremely warm, the pre-loaded condition of the balls exceeds the dimensional changes resulting from expansion or contraction of the other parts of the assembly. Since there is never any play between any of the members or seizure thereof, adjustments may be made with the same ease and dispatch when a very slight pre-loaded condition exists or when extreme pressure is imposed on the balls as often occurs when the tool is in use.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A boring head comprising a cylindrical housing having an axial bore throughout the length thereof, an eccentric sleeve in said bore, an anti-friction bearing intermediate the sleeve and the housing, a boring bar in said sleeve, anti-friction bearings intermediate said sleeve and said bar, a bearing on the outer end of said bar abutting an end portion of the sleeve, spring means on the inner end of said bar urging the bearing on the bar against the end portion of the sleeve, a cutting tool in said bar, and means on the inner end of the bar for rotatively driving said bar from said housing.

2. A boring head comprising a housing having an axial bore therein, an eccentric tubular sleeve in said bore, a boring bar in said sleeve, anti-friction bearings intermediate said bar, said sleeve, and the housing and sleeve, a cutter in said bar, an enlarged outer end on said bar, a nut on the opposed end of the bar for supporting the enlarged portion of the bar in abutting relation with the outer end of the sleeve, and a key in said nut and said housing for the interlocked engagement thereof.

3. A boring head comprising a housing having an axial bore therein, an eccentric tubular sleeve in said bore, a boring bar in said sleeve, anti-friction bearings intermediate said bar, said sleeve, and the housing and sleeve, a cutter in said bar, a conical bearing seat in the end of said housing, a conical bearing in the end of the sleeve engaged therewith, a conical bearing seat in the end of said sleeve, a conical bearing adjacent the end of said bar engaged with the seat in said sleeve, a nut on the inner end of said bar, springs intermediate said nut and said housing for the retention of the conical bearings upon their respective seats, and a key intermediate said nut and said housing.

4. A boring tool comprising a housing having an axial bore therein, an eccentric sleeve in said bore, a pre-loaded ball bearing thereon, a boring bar in said sleeve, a pre-loaded ball bearing thereon, an enlarged head on said bar engaged with the end portion of said sleeve, a tool bit in said bar, a nut on the inner end of said bar, a spring intermediate said nut and said housing for the support of the nut in spaced relation with the housing and urging the enlarged end of the bar into intimate engagement with the contiguous portion of the sleeve, and a driving key connecting said nut with said housing.

5. A boring tool comprising a housing having an axial bore therein, an eccentric sleeve in said bore, a pre-loaded ball bearing thereon, a boring bar in said sleeve, a pre-loaded ball bearing thereon, an enlarged head on said bar engaged with the end portion of said sleeve, a tool bit in said bar, graduation marks on said sleeve calibrated in relation to the eccentricity of the sleeve, means on the inner end of the boring bar for supporting the enlarged portion of the bar in intermediate engagement with the contiguous end of the sleeve, and means for locking the nut against rotation relative to the housing.

6. A boring tool comprising a housing having an axial bore therein, an eccentric sleeve in said bore, a boring bar in said sleeve, balls intermediate the sleeve and housing and boring bar and sleeve, an enlarged end on said bar, a cutter therein, a nut on the inner end of the bar disposed in spaced relation with the contiguous face of the housing, a key intermediate the nut and the housing, and means associated with the bar for drawing the enlarged end thereof into intimate engagement with the contiguous end of the sleeve.

7. A boring tool comprising a cylindrical body engaged with the driving spindle in a machine tool, said body having an axial bore therein, an eccentric sleeve in said bore, an enlarged end on said sleeve engaged with said body, a boring bar in said sleeve, an enlarged end thereon engaged with the enlarged end of said sleeve, a cutting tool in the enlarged end of the bar, means on the opposed end of said bar to delimit axial movement thereof, spring means in said body urging the enlarged end of the boring bar into seated engagement with the enlarged end of said sleeve, and a key for rotatively driving said bar from the machine tool spindle.

8. A boring tool comprising a retainer operatively engaged with the spindle of a machine tool, said retainer having an axial bore therein, an eccentric sleeve mounted in said bore, a shoulder on the outer end of said sleeve engaged with said retainer, a boring bar in said sleeve, a shoulder on the outer end thereof engaged with said sleeve, a cutter in said bar, a stop on the inner end of said bar to limit axial movement thereof, a key intermediate said stop and said retainer for driving said bar, and a spring intermediate said stop and said retainer urging the shoulder on said bar into seated engagement with the outer end of said sleeve.

9. A boring tool comprising a cylindrical body operatively engaged with the driving spindle in the machine tool, said body having an axial bore therein, an eccentric sleeve in said bore, an enlarged end on said sleeve engaged with said body, a boring bar in said sleeve, an enlarged end thereon, an anti-friction thrust bearing intermediate the enlarged end of the bar and the enlarged end of the sleeve, a cutting tool in the outer end of the bar, a nut on the inner end of the bar having a groove in the circumferential face thereof and a circumferentially elongated key seat therein, a key intermediate said seat and said body, a spring in said groove engaged with said key, an anti-friction thrust bearing intermediate said nut and said body, a spring intermediate said thrust bearing and said nut, and a cutting tool in the enlarged end of the bar.

10. A boring tool comprising a retainer operatively engaged with the spindle of a machine tool, said retainer having an axial bore therein, an eccentric sleeve mounted in said bore, a shoulder on the outer end of said sleeve engaged with said retainer, a boring bar in said sleeve, a shoulder on the outer end thereof engaged with said sleeve, a cutter in said bar, a stop mounted on said bar having a circumferential groove therein and a circumferentially elongated key seat therein, a key intermediate said stop and said retainer for driving said bar, a spring in the groove in said stop compressively engaged with said key and spring means intermediate said stop and said retainer urging the shoulder on the bar into intimate engagement with said sleeve.

11. A boring tool comprising a cylindrical body operatively engaged with the driving spindle in a machine tool, said body having a tapered axial bore therein, an eccentric sleeve in said bore, an enlarged tapered end on said sleeve engaged with said body, a boring bar in said sleeve, an enlarged tapered end thereon engaged with the tapered end of said sleeve, a cutting tool in the enlarged end of said bar, a nut on the opposed end of said bar to delimit axial movement thereof, a spring intermediate said nut and said body urging the enlarged tapered end of the boring bar into engagement with said sleeve and a key intermediate said nut and said body for driving said bar.

OTTIS R. BRINEY, Jr.

REFERENCES CITED

The following references are of record in the file of this patent:

UNITED STATES PATENTS

| Number | Name | Date |
| --- | --- | --- |
| 981,566 | Jarvis | Jan. 10, 1911 |
| 1,174,309 | Clermont | Mar. 7, 1916 |
| 1,493,051 | O'Brien | May 6, 1924 |
| 1,907,408 | Schimmel | May 2, 1933 |
| 2,456,776 | Faust | Dec. 21, 1948 |

FOREIGN PATENTS

| Number | Country | Date |
| --- | --- | --- |
| 48,779 | Sweden | Oct. 1, 1918 |
| 142,194 | Great Britain | Apr. 29, 1920 |